US011451524B2

(12) United States Patent
Tomaru (10) Patent No.: US 11,451,524 B2
(45) Date of Patent: Sep. 20, 2022

(54) NETWORK SYSTEM INTERFACE FOR CONTROLLING CONFIDENTIAL INFORMATION

(71) Applicant: Hitachi, Ltd., Tokyo (JP)

(72) Inventor: Tatsuya Tomaru, Tokyo (JP)

(73) Assignee: HITACHI, LTD., Tokyo (JP)

( * ) Notice: Subject to any disclaimer, the term of this patent is extended or adjusted under 35 U.S.C. 154(b) by 300 days.

(21) Appl. No.: 16/695,485

(22) Filed: Nov. 26, 2019

(65) Prior Publication Data

US 2020/0169542 A1 May 28, 2020

(30) Foreign Application Priority Data

Nov. 28, 2018 (JP) .............................. JP2018-221990

(51) Int. Cl.
*H04L 9/40* (2022.01)
(52) U.S. Cl.
CPC ........ *H04L 63/0464* (2013.01); *H04L 63/029* (2013.01); *H04L 63/0209* (2013.01); *H04L 63/0227* (2013.01)
(58) Field of Classification Search
CPC ............. H04L 63/0209; H04L 63/0227; H04L 63/029; H04L 63/0464
See application file for complete search history.

(56) References Cited

U.S. PATENT DOCUMENTS

| 10,298,544 | B2 * | 5/2019 | Duval ................. H04L 12/4641 |
| 2004/0054914 | A1 * | 3/2004 | Sullivan ................ G06F 21/606 |
| | | | 713/189 |
| 2009/0006542 | A1 * | 1/2009 | Feldman ............. G06F 16/4387 |
| | | | 709/203 |
| 2014/0056576 | A1 * | 2/2014 | Miura ................ H04N 21/2668 |
| | | | 386/284 |
| 2016/0112189 | A1 | 4/2016 | Tomaru |
| 2017/0078114 | A1 * | 3/2017 | Mibu ................... H04L 41/0806 |
| 2019/0327112 | A1 * | 10/2019 | Nandoori ................ H04L 63/02 |

FOREIGN PATENT DOCUMENTS

WO 2014/199474 A1 12/2014

* cited by examiner

*Primary Examiner* — Linglan Edwards
(74) *Attorney, Agent, or Firm* — Mattingly & Malur, PC (57) ABSTRACT

In a network system that connects a site 100 and a site 200 to each other via an open network and a closed network, an interface 131 performs control so that format information of confidential information can pass but the confidential information cannot pass therethrough between a computer 111 and a computer 121. An interface 231 performs control so that format information of confidential information can pass but the confidential information cannot pass therethrough between a computer 211 and a computer 221.

6 Claims, 9 Drawing Sheets

EXAMPLE OF HOLDERS IN PC 121

EXAMPLE OF COMMAND PASSING THROUGH INTERFACE 131

DOWNWARD COMMAND　Command_192.168.1.11_192.168.10.3_
　　　　　　　　　　Send_192.168.10.3_192.168.10.4_
　　　　　　　　　　holder001\holder011\holder112\FileA UPWARD COMMAND　Command_192.168.10.3_192.168.1.11_
　　　　　　　　　Tree\holder001\holder011\holder111
　　　　　　　　　&\holder011\holder112\FileA&FileB
　　　　　　　　　&\holder011\holder113
　　　　　　　　　&\holder001\holder012

FIG. 3C

EXAMPLE OF HOLDERS IN PC 221

[RECEIVEHOLDER 001]—— FILE A (RECEIVED FILE)

EXAMPLE OF COMMAND PASSING THROUGH INTERFACE 231

UPWARD COMMAND　Command_192.168.10.4_192.168.2.21_
　　　　　　　　　Receive_192.168.10.3_192.168.10.4_
　　　　　　　　　Receiveholder001\FileA

NETWORK SYSTEM INTERFACE FOR CONTROLLING CONFIDENTIAL INFORMATION

CROSS-REFERENCE TO RELATED APPLICATION

The present application claims priority from Japanese application JP 2018-221990, filed on Nov. 28, 2018, the contents of which is hereby incorporated by reference into this application.

BACKGROUND OF THE INVENTION

1. Field of the Invention

The present invention relates to a network system.

2. Description of the Related Art

As represented by the word Internet of Things (IoT), now a days, everything is connected through a network. However, not all information is shared among all things, and only certain things share certain information. In particular, important information is shared only among limited things (people) and needs to be isolated from other things (people). To achieve this, a network may be set up among information sharers to eliminate the possibility of intervention by a third party. Specifically, a network may be set up by a dedicated line. This is relatively easy for information sharers who stay close to each other, but becomes difficult if an information sharer is at a remote location.

Therefore, a technology called Virtual Private Network (VPN) has been developed. This technology is that a plurality of local networks at remote locations are connected to each other via a wide area network, and encryption and decryption are respectively performed at the exit and the entrance of the local networks. Thus, the local networks are virtually provided on the same network, while being separated from a wide area network to ensure security.

VPN can be secure if the encryption strength is sufficient and the local network is completely closed. However, VPN requires connection to a wide area network (open network) as a basic condition, and it is not a method that makes it operate in a closed network. In general, networks are not completely closed, and are connected to the wide area network (open network) through some kind of path.

In other words, a local network is generally part of an open network. At the point of contact between the local network and the wide area network, a firewall is set up, and only limited information can pass therethrough. However, malicious third parties will try to find the flaws of firewalls to invade the local network. The local network side will also take various countermeasures, only resulting in a rat race. A truly secure network cannot be obtained unless the local network is separated from the open network.

However, in many cases, it is necessary to be connected to an open network while having information to be kept secret. All things considered, the network must be established under conflicting requirements.

In this regard, various methodologies for achieving secure communications have been studied. For example, WO 2014/199474 describes an example of a communication system for such a purpose.

SUMMARY OF THE INVENTION

For improving security, establishing a closed network is a solution. For remote locations, establishing a virtually closed network with VPN is also a solution. However, VPN is the technology that establishes a virtually closed network after the connection to an open network, and thus is not for completely closed network. As is also apparent from this, it is difficult to achieve a completely closed local network. Thus, many local networks are part of an open network, and thus involve a risk of detracting information security.

An object of the present invention is to provide a network system capable of enabling an open network and a closed network to coexist, so that usability and security can both be guaranteed.

In a network system according to an aspect of the present invention that connects a first site and a second site to each other via an open network and a closed network, the first site includes a first computer, a second computer, and a first interface connecting the first computer and the second computer to each other, the second site includes a third computer, a fourth computer, and a second interface connecting the third computer and the fourth computer to each other, the first computer and the third computer belong to the open network, the second computer and the fourth computer belong to the closed network, the first interface performs control so that format information of first confidential information passes through the first interface but the first confidential information itself does not pass through the first interface between the first computer and the second computer, and the second interface performs control so that format information of second confidential information passes through the second interface but the second confidential information itself does not pass through the second interface between the third computer and the fourth computer.

According to an aspect of the present invention, a network system capable of enabling an open network and a closed network to coexist, so that usability and security can both be guaranteed can be provided.

DESCRIPTION OF THE PREFERRED EMBODIMENTS

Embodiments will be described below with reference to the drawings.

First Embodiment

Figure 1:
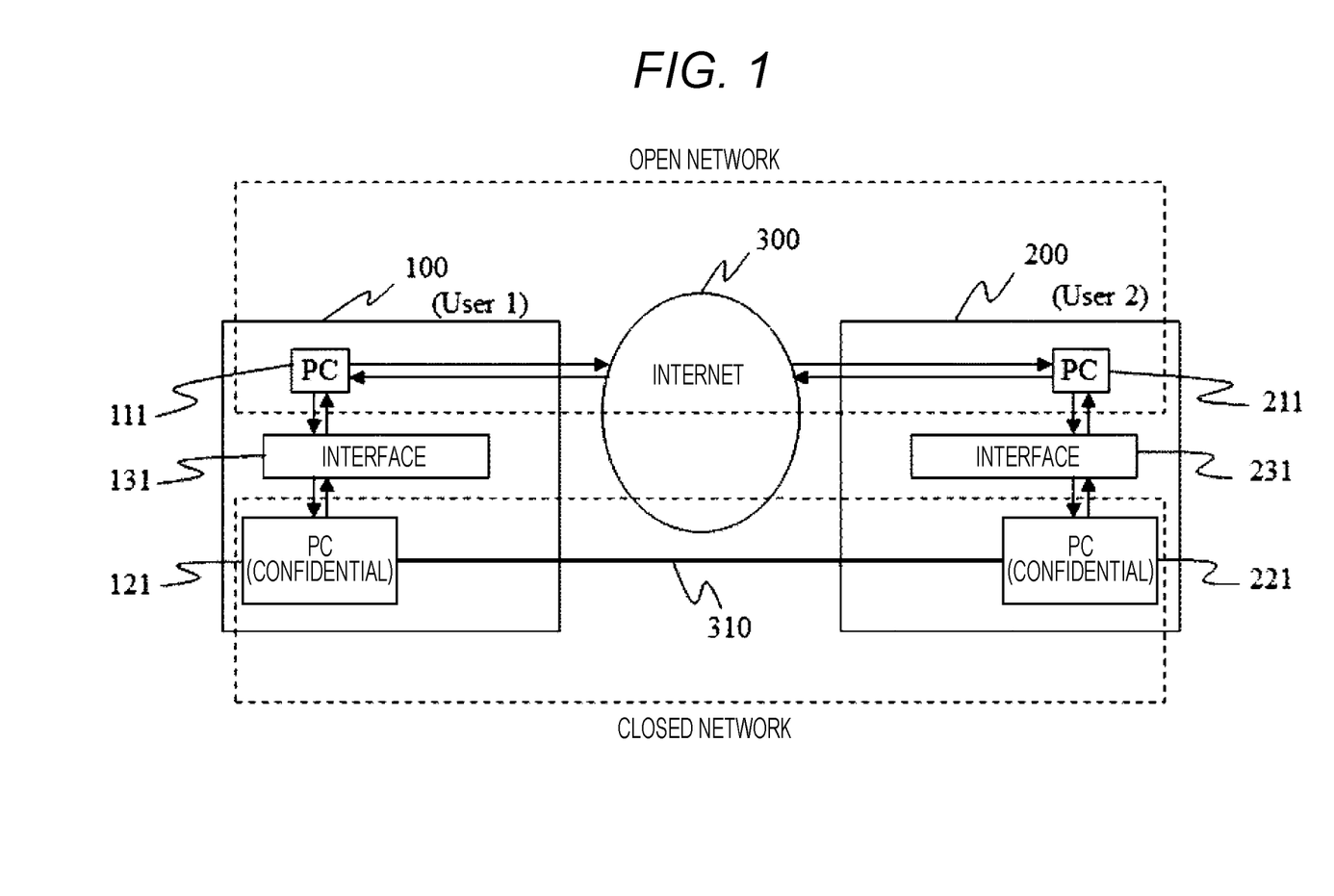
FIG. 1 is a diagram illustrating a configuration of a network system according to a first embodiment.

The configuration of the network system of the first embodiment will be described with reference to FIG. 1. As illustrated in FIG. 1, a site 100 and a site 200 are connected to each other via a wide area network 300. The site 100 has a general purpose computer (PC) 111, a computer (PC) 121 including confidential information, and an interface 131 connecting the computers 111 and 121 to each other. Similarly, the site 200 has a general purpose computer (PC) 211, a computer (PC) 221 including confidential information, and an interface 231 connecting the computers 211 and 221 to each other.

The computer 111 and the computer 211 are directly connected to the wide area network 300 to form an open network. The computer 121 and the computer 221 are connected to each other by a dedicated line 310 to form a closed network.

As described above, the network system according to the first embodiment includes an open network and a closed network, and the two networks are connected to each other via the interface 131 and the interface 231. Note that the connection here is assumed to have strong restriction, meaning only limited commands can pass, and general information cannot pass. Because only limited commands can pass, no confidential information leaks from the closed network to the open network. A specific example of the command will be described in a third embodiment.

The interface 131 and the interface 231 are preferably composed of dedicated circuits such as a Field Programmable Gate Array (FPGA) and an Application Specific Integrated Circuit (ASIC). There is also a possibility that these are formed by general purpose devices, and that commands that can pass are specified software-wise. However, the use of general purpose devices involves a risk of attack exploiting their nature. In order to eliminate this risk, dedicated circuits that cannot perform operations other than the target operations are preferable for the sake of security. Of course, considering the fact that usability is also important and that there may be various security levels, the interface 131 and the interface 231 may be implemented using general purpose devices.

Here, it is assumed that the computer 111 and the computer 121 are paired, and a user 1 of the computer 111 holds confidential information in the computer 121. Similarly, it is assumed that the computer 211 and the computer 221 are paired, and a user 2 of the computer 211 holds confidential information in the computer 221. When the user 1 wants to send the confidential information to the user 2, the computer 111 sends a command to the computer 121, and the computer 121 sends the confidential information to the computer 221 via the closed network. Thus, the user 2 acquires the confidential information of the user 1.

Although the users 1 and 2 are connected with each other via the open network, they can share information securely. What is important in this context is that confidential information stays in a closed network. Thus, the information can be kept secure. According to the first embodiment, the connection via the open network and the keeping the confidential information in the closed network can both be achieved. That is, the networks form a two-story structure.

A characteristic point in the first embodiment is that the open network and the closed network are separated. Although there are slight connection via the interface 131 and the interface 231, only limited commands can pass and important information cannot pass.

By the way, there is a technology called a firewall, which is installed at a connection point between a wide area network (open network) and a local network. The technology aims to separate the wide area network and the local network from each other, and thus may seem like an idea similar to the present invention. But there is a clear difference between these.

Suppose that there are a local network A of an organization A and a local network B of an organization B. It is assumed that the local network A and the local network B are not directly connected to each other. In this case, communications between the local network A and the local network B will be done via a wide area network. Thus, important information in the local network A to be sent to the local network B will be sent through a wide area network (open network). Therefore, it is assumed that a firewall at the connection point between the local network and the wide area network allows passage of information that is important at a certain level.

On the other hand, in the present invention, the sites 100 and 200 belong to both an open network and a closed network, and important information is transmitted and received within the closed network. The important information will never be sent through the open network. This is the difference between the firewall and the present invention.

Open networks are not secure because they can be exposed to various attacks such as eavesdropping, tampering, and virus spread by third parties. In view of this, various kinds of Virtual Private Network (VPN), which virtually forms a private network on an open network, have been developed to improve security. However, in existing VPN, encrypted information is transmitted and received between communication devices in a state where connection to an open network is established, and thus an open network and a closed network are not separated from each other as in the present invention. Also, there are opportunities that terminals used for the VPN may be connected to an open network without via the VPN. Thus, even though VPN is used, various security holes exist. The present invention solves this problem by separating open and closed networks from each other.

As described above, the network system according to the first embodiment is a network system which connects the first site (100) and the second site (200) to each other via the open network and the closed network.

The first site (100) includes a first computer (111), a second computer (121), and a first interface (131) that connects the first computer (111) and the second computer (121) to each other.

The second site (200) includes a third computer (211), a fourth computer (221), and a second interface (231) that connects the third computer (211) and the fourth computer (221) to each other.

The first interface (131) performs control so that format information of confidential information can pass but the confidential information cannot pass therethrough between the first computer (111) and the second computer (121). The second interface (231) performs control so that format information of confidential information can pass but the confidential information cannot pass therethrough between the third computer (211) and the fourth computer (221).

The first site (100) and the second site (200) are connected to the open network via a wide area network (300). The first site (100) and the second site (200) are connected to the closed network via a dedicated line 310.

In the first embodiment, the open network and the closed network form a two-story structure so that each user belongs to both networks, and the properties of both networks can be utilized. This enables coexistence of an open network and a closed network, whereby usability and security can both be guaranteed. Users can securely share information with other parties who belong to the open network using the closed network.

Second Embodiment

A configuration of a network system of a second embodiment will be described with reference to FIG. 2. In the first embodiment, the dedicated line 310 is used to form a closed network. However, it is not easy to provide the dedicated line 310 in a case where the closed network is desired to be extended to a remote location. In such a case, it is effective to form a virtually closed network using encryption.

Figure 2:
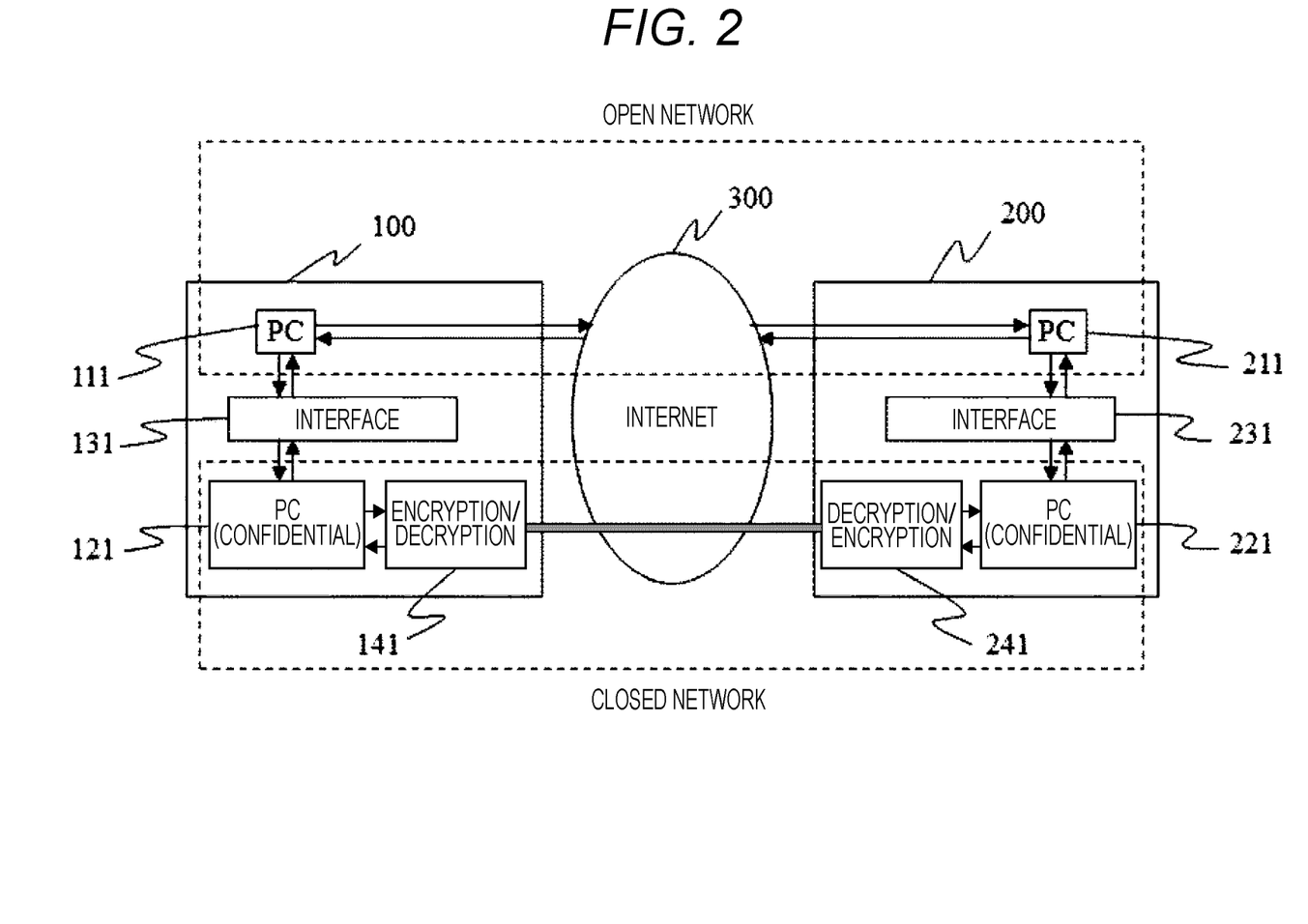
FIG. 2 is a diagram illustrating a configuration of a network system according to a second embodiment.

As illustrated in FIG. 2, output information from the computer 121 is encrypted by an encryption/decryption unit 141 and is then transmitted to the site 200. The encrypted information that has reached the site 200 is decrypted by a decryption/encryption unit 241 and then reaches the computer 221. When information is sent from the site 200 to the site 100, the information is encrypted by the decryption/encryption unit 241 and is decrypted by the encryption/decryption unit 141.

In the configuration illustrated in FIG. 2, information is encrypted between the encryption/decryption unit 141 and the decryption/encryption unit 241. The wide area network 300 is used for a transmission path itself, instead of a dedicated line. However, the wide area network 300 is merely a transmission path because information is encrypted there. A computer in the wide area network 300 needs to have the encryption/decryption unit 141 or the decryption/encryption unit 241 to communicate with the computer 121 or the computer 221. A user without the encryption/decryption unit 141 or the decryption/encryption unit 241 cannot communicate with the computer 121 or the computer 221. Based on this property, the computer 121 and the computer 221 form a virtually closed network.

In the second embodiment, the encryption/decryption unit 141 and the decryption/encryption unit 241 do not have particular restrictions. Since VPN is a technology for implementing encryption at the exit and decryption at the entrance, various VPN technologies may be applied as the encryption/decryption unit 141 and the decryption/encryption unit 241.

However, it should be noted that the configuration is different between the present invention and VPN. Let us describe the normal usage of VPN using FIG. 2. VPN is used by installing software corresponding to the encryption/decryption unit 141 in the computer 121. This means that the computer 121 also is connected to the wide area network 300. On the other hand, in the present invention, the encryption/decryption unit 141 is provided between the computer 121 and the wide area network 300, and thus the computer 121 is not directly connected to the wide area network 300. This is the difference. Thanks to this different configuration, a truly closed network can be established.

Furthermore, a normal VPN is generally implemented as software and operates on various types of OS. Thus, it operates as a general-purpose element. As described above for the interface 131 and the interface 231, when a general purpose device is used, there may be various attacks exploiting the nature of the general purpose device. Therefore, the encryption/decryption unit 141 and the decryption/encryption unit 241, which are the signal processing units, are preferably composed of dedicated circuits such as FPGA and ASIC.

Of course, since there may be various security levels, the encryption/decryption unit 141 and the decryption/encryption unit 241 may be implemented with general-purpose devices. In addition, to improve security in particular, a method utilizing unpredictability of noise can also be used (see, for example, WO 2014/199474 A1, Tomaru (arXiv 1803.05090)).

As described above, the network system according to the second embodiment includes the encryption/decryption unit (141) connected to the second computer (121) and the decryption/encryption unit (241) connected to the fourth computer (221).

The encryption/decryption unit (141) and the decryption/encryption unit (241) use the wide area network (300) as a transmission path that is for a virtually closed network. For the open network, the first site (100) and the second site (200) are connected to each other via the wide area network (300). For the closed network, the first site (100) and the second site (200) are connected to each other via a virtually closed network.

Thus, in the network system of the second embodiment, the encryption/decryption unit (141) is provided between the second computer (121) and the wide area network (300), so that the second computer (121) is separated from the wide area network (300). The decryption/encryption unit (241) is provided between the fourth computer (221) and the wide area network (300), so that the fourth computer (221) is separated from the wide area network (300).

Third Embodiment

A configuration of a network system of a third embodiment will be described with reference to FIG. 3A, FIG. 3B, and FIG. 3C.

As described in the first and second embodiments, the interface 131 and the interface 231 allow passage of only limited commands. With this limitation, open and closed networks are substantially separated from each other. How the commands that can pass through the interface 131 and the interface 231 are set depends on usage. In the third embodiment, an example of a case is described where important information such as confidential information is stored in the form of a file in the computer 121 and the computer 221.

Figure 3A:
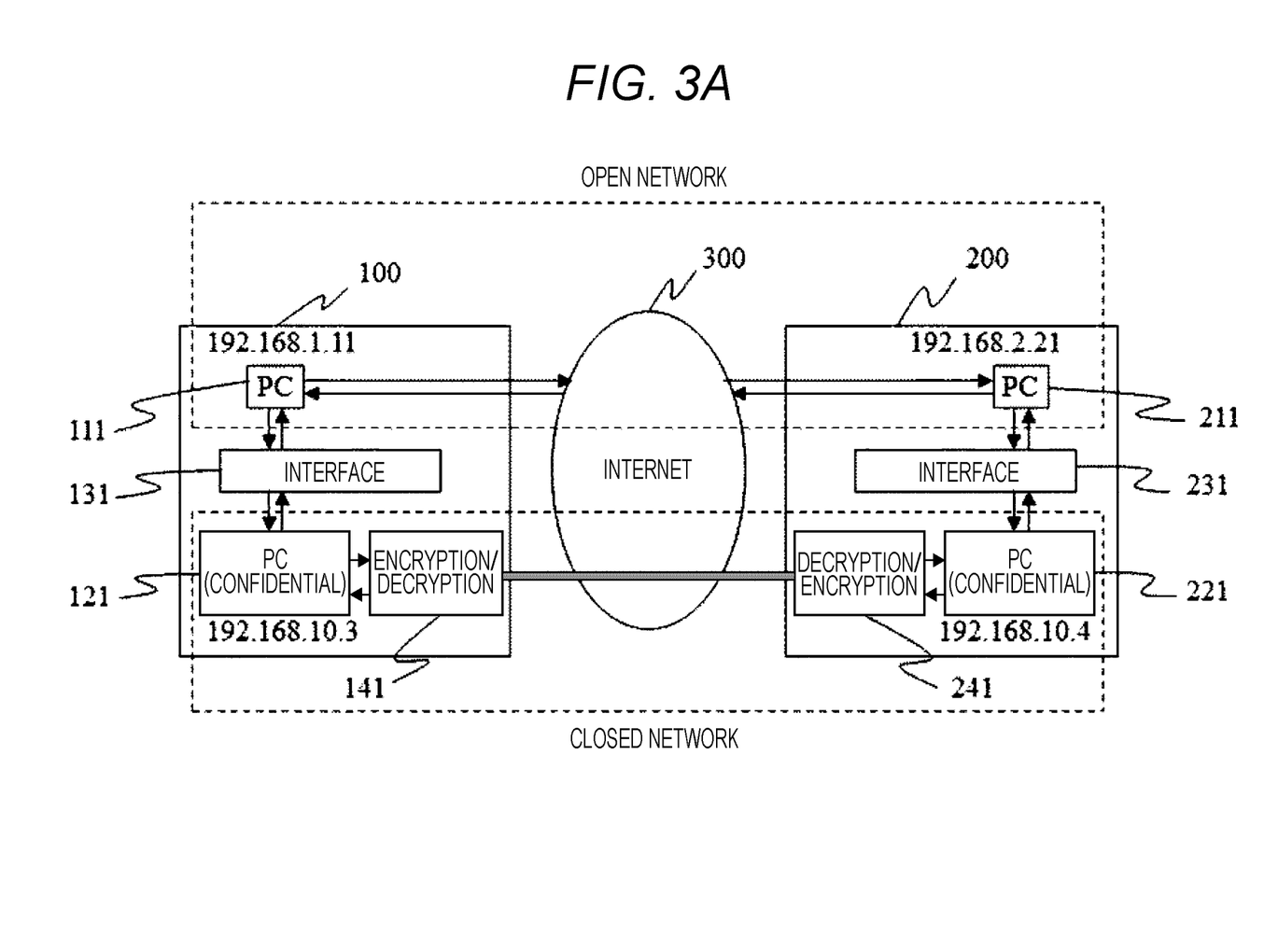
FIG. 3A is a diagram illustrating an example of a configuration of a network system according to a third embodiment.
Figure 3B:
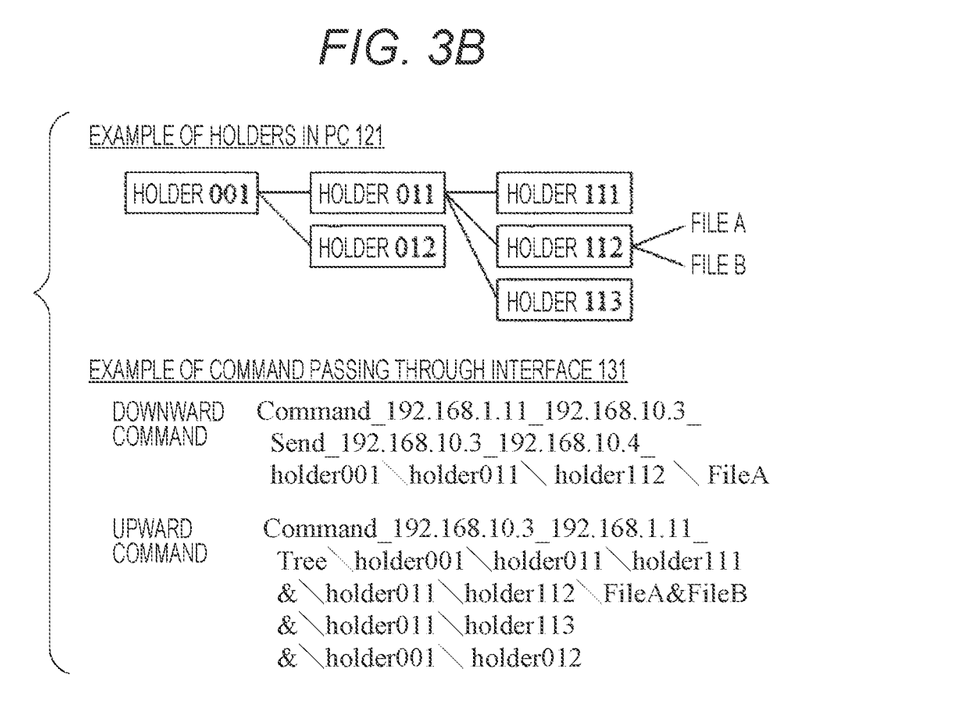
FIG. 3B is a diagram illustrating an example of holders and commands passing through an interface in a PC.
Figure 3C:
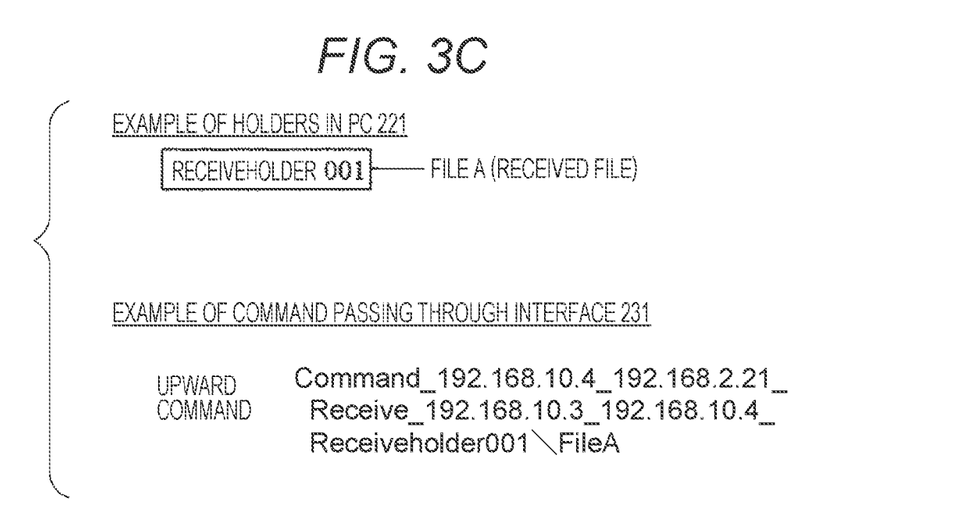
FIG. 3C is a diagram illustrating an example of a holder and a command passing through an interface in a PC.

As illustrated in FIG. 3A, it is assumed that respective IP addresses are assigned to the computer 111, the computer 121, the computer 211, and the computer 221. Furthermore, as illustrated in FIG. 3B and FIG. 3C, files are managed in the computer 121 and the computer 221 as in general computers. Specifically, the files are provided with file names, and stored in holders forming a tree structure.

Now, it is assumed that a secret file A is to be sent from the computer 121 to the computer 221. To do so, the computer 111 sends a command, indicating such an intention, to the computer 121. The information required for the command is listed below. (1) A command is from the computer 111 to the computer 121. (2) Task content: Sending a file from the computer 121 to the computer 221. (3) File transmitter: IP address of the computer 121. (4) File receiver: IP address of the computer 221. (5) File name: Name of holder storing a file and the file name.

The holder name is specified also including the tree structure. The information that needs to pass through the interface 131 in this task is just the above-mentioned information. Other information is not allowed to pass through the interface 131. Because software for transmitting and receiving files operates on the computer 121 and the computer 221, the information about the software does not need to pass through the interface 131. Thus, the information that needs to pass through the interface 131 is limited to the above (1) to (5).

Let this task's command name be "Send". Then, a command to pass the interface 131 is, for example, "Command-192.168.1.11-192.168.10.3-Send-192.168.10.3-192.168.10.4-Holder001\Holder011\Holder112\FileA".

In the above task, the computer 111 needs to know where in the computer 121 the file A is stored. Therefore, the holder name and the file name are allowed to pass through the interface 131. In this case, a command sent from the computer 121 to the computer 111 is, for example, "Command-192.168.10.3-192.168.1.11-Tree\Holder001\Holder011\Holder111&\Holder011\Holder112\FileA&FileB&\Holder011\Holder113&\Holder001\Holder012".

Necessary tasks are specifically determined in this way, and commands that can pass through the interface 131 are limited to those. For example, let us assume that only "Command", "Send", and "Tree" are registered for passage. In this setting, all commands except for these three commands are rejected by the interface 131 and cannot pass therethrough. In addition, the passing condition is made stricter by fixing the locations of the IP address as well as those of "Command", "Send", "Tree", and the like in each command.

What is important here is that the computer 111 cannot see the contents of the file A in the computer 121. The file name can pass through the interface 131 but the contents of the file cannot pass therethrough. This mechanism keeps important information in a closed network.

The user of the computer 211 needs to know that important information has been delivered to the computer 221. Thus, a notification indicating the delivery is transmitted from the computer 221 to the computer 211. In this case, the command to pass through the interface 231 is as follows. (1) A command is from the computer 221 to the computer 211. (2) Task: Notification indicating transmission of a file from the computer 121 to the computer 221. (3) File transmitter: IP address of the computer 121. (4) File receiver: IP address of the computer 221. (5) File name: Name of holder storing a file and file name. The holder name is specified also including the tree structure. The information required in this task is just those.

A specific command is "Command-192.168.10.4-192.168.2.21-Receive-192.168.10.3-192.168.10.4-ReceiveHolder001\FileA". As similar to the interface 131, commands which need to pass through the interface 231 are carefully selected and commands that can pass therethrough are limited to only those.

The computer 211 recognizes that the file A has been delivered to the computer 221 but cannot see the contents of the file A. The contents of the file can only be viewed on computer 221. This mechanism keeps important information in a closed network.

So far, we have described the commands that are allowed to pass through the interface 131 and the interface 231 by using an example where an important file such as confidential information is sent from the computer 121 to the computer 221. The contents of the command vary depending on the task. Tasks are determined depending on the system, and only the minimum information necessary for the tasks is allowed to pass through the interface 131 and the interface 231.

Fourth Embodiment

A configuration of a network system of a fourth embodiment will be described with reference to FIG. 4, FIG. 5, and FIG. 6.

In the first to third embodiments, the sites 100 and 200 respectively have the computer 111 and the computer 211 for an open network and the computer 121 and the computer 221 for a closed network. However, the number of computers may be any number.

Figure 4:
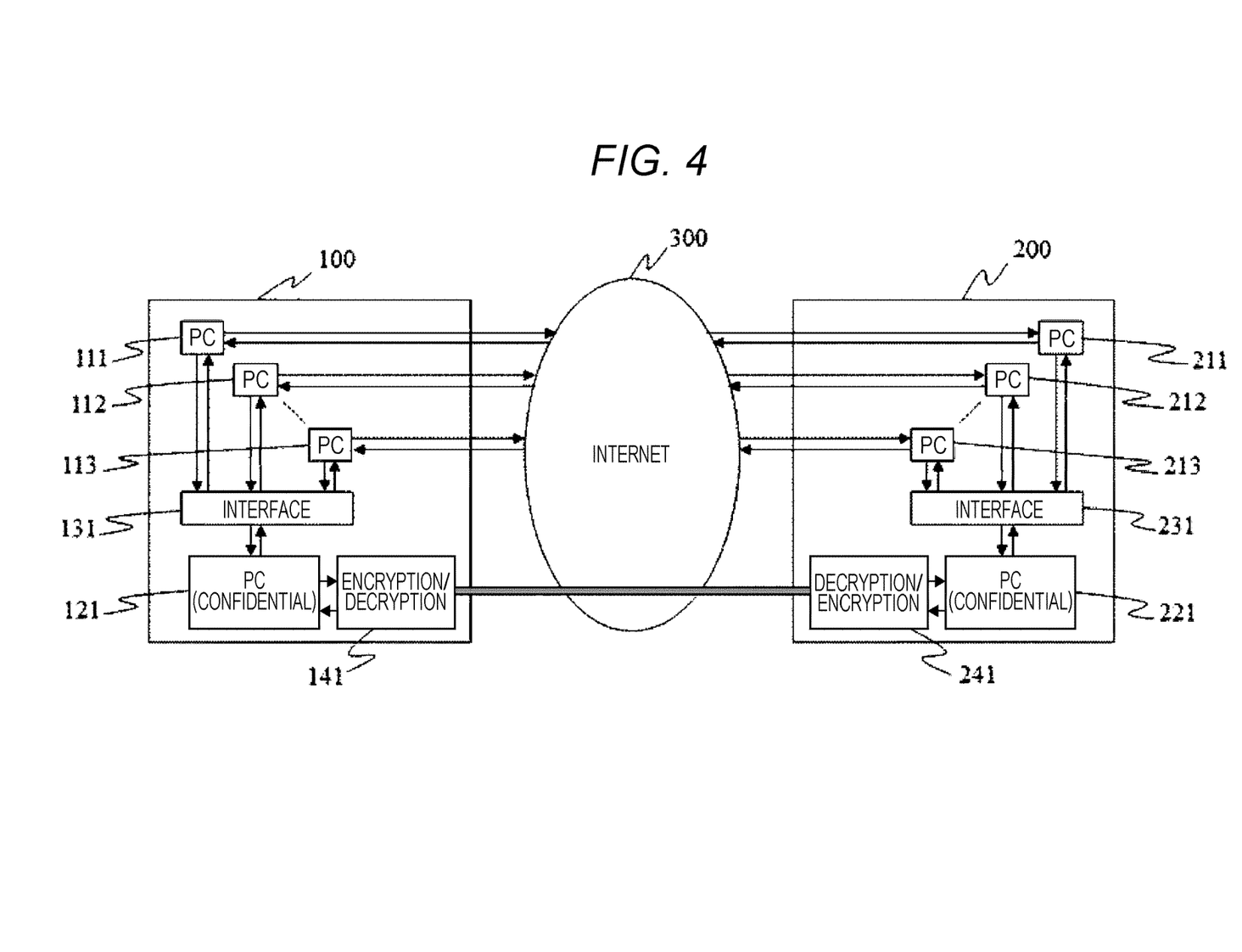
FIG. 4 is a diagram illustrating a configuration of a network system according to a fourth embodiment.

For example, a configuration, as illustrated in FIG. 4, may be employed in which one computer (computer 121 and computer 221) for a closed network is provided in each of the sites 100 and 200, and a plurality of computers (computer 111, computer 112, computer 113, computer 211, computer 212, and computer 213) for an open network are provided in each of the sites 100 and 200.

Figure 5:
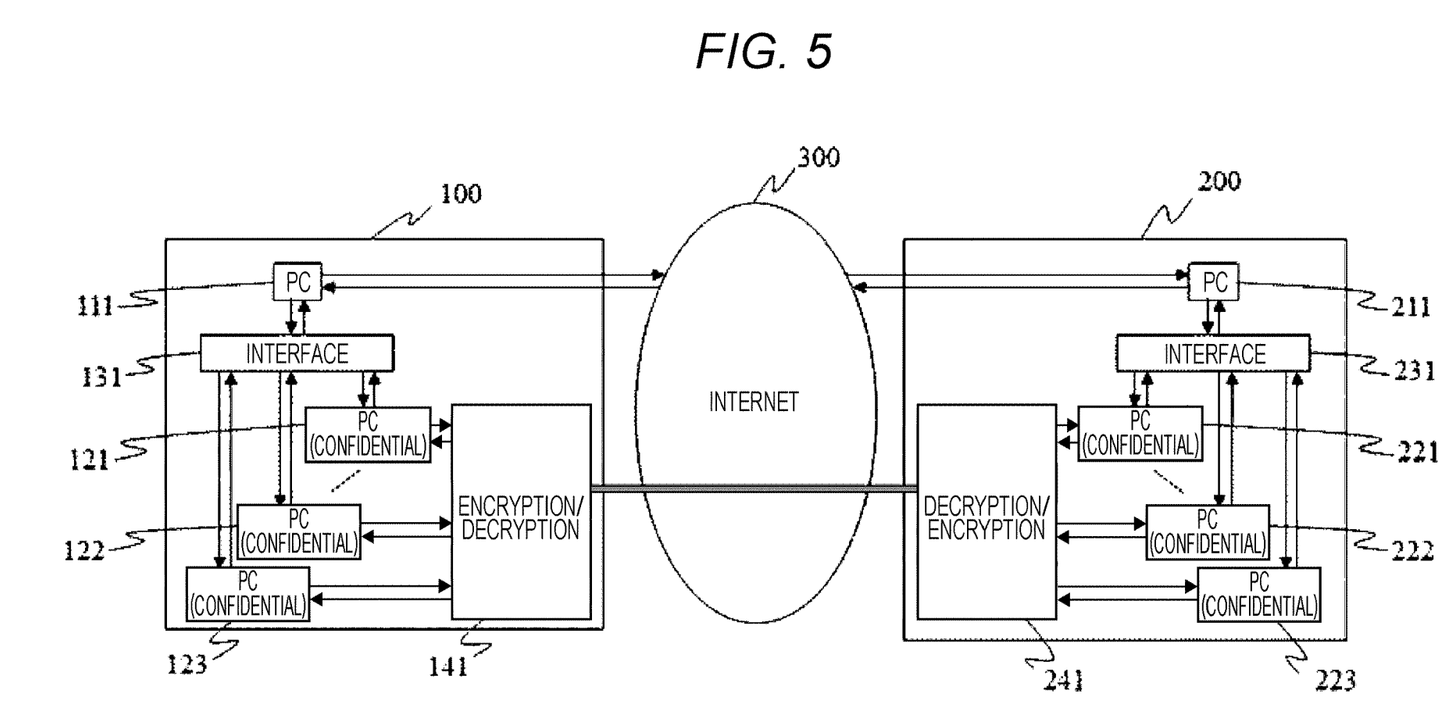
FIG. 5 is a diagram illustrating another configuration of the network system according to the fourth embodiment.

Conversely, a configuration, as illustrated in FIG. 5, may be employed in which a plurality of computers (computer 121, computer 122, computer 123, computer 221, computer 222, and computer 223) for a closed network are provided in each of the sites 100 and 200, and one computer (computer 111 and computer 211) for an open network is provided in each of the sites 100 and 200.

Figure 6:
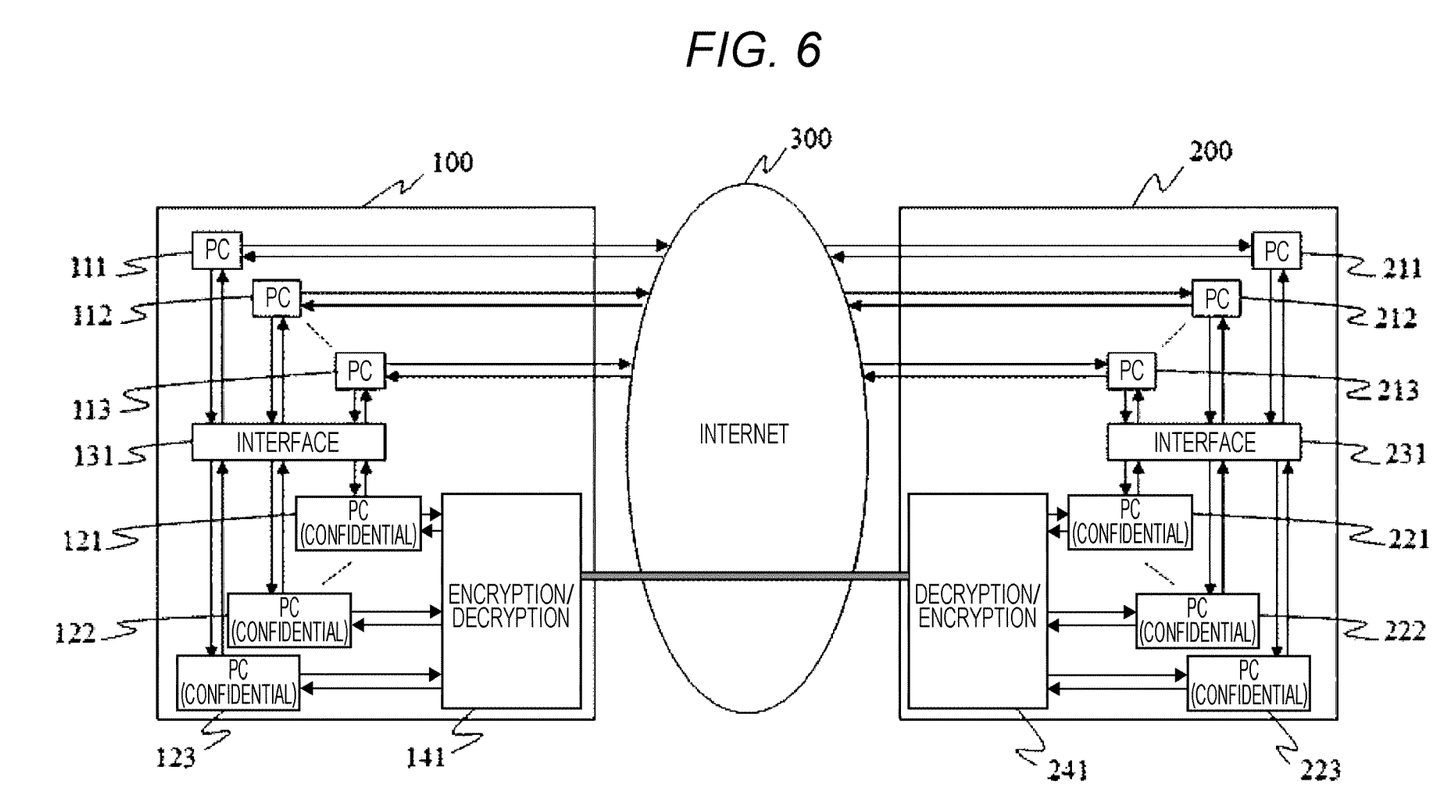
FIG. 6 is a diagram illustrating another configuration of the network system according to the fourth embodiment.

Alternatively, a configuration, as illustrated in FIG. 6, may be employed in which a plurality of computers are provided for both the open and closed networks. Specifically, a configuration may be employed in which a plurality of computers (computer 111, computer 112, computer 113, computer 211, computer 212, and computer 213) for an open network are provided in each of the sites 100 and 200, and a plurality of computers (computer 121, computer 122, computer 123, computer 221, computer 222, and computer 223) for a closed network are provided in each of the sites 100 and 200

Here, FIGS. 4 to 6 illustrate expanded versions of FIG. 2. Alternatively FIG. 1 may be expanded.

Fifth Embodiment

Figure 7:
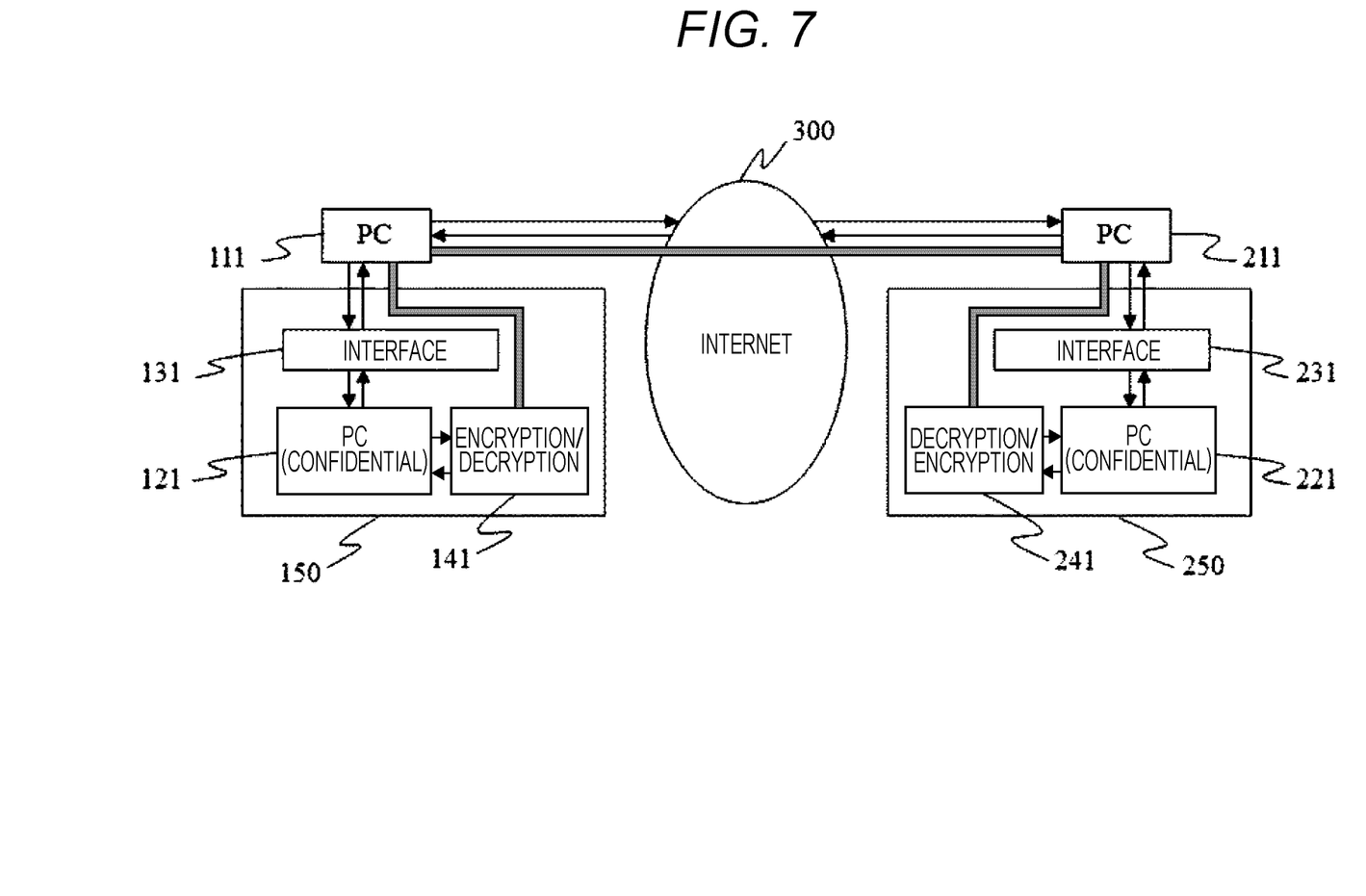
FIG. 7 is a diagram illustrating a configuration of a network system according to a fifth embodiment.

A configuration of a network system of a fifth embodiment will be described with reference to FIG. 7. As described in the first to the fourth embodiments, computers for an open network and computers for a closed network are provided, and the computers for the open network operate in the open network and the computers for the closed network operate in the closed network in the present invention. This is basic.

However, the user would want to execute tasks without being aware of open and closed networks so much. FIG. 7 illustrates one way of achieving this.

The interface 131, the computer 121, and the encryption/decryption unit 141 are treated as a package 150, which is one component of the computer 111. Here, the package 150 is, for example, a component connected to a PC via a board for the PC or a USB.

Similarly, on the computer 221 side, the interface 231, the computer 221, and the decryption/encryption unit 241 are combined into a package 250. Thus, a virtually closed network also is connected via the computer 111 and the computer 211. As a result, the user of each of the computer 111 and the computer 211 can use the closed network without being aware of it.

As mentioned in the third embodiment, the computer 111 cannot view the contents of files in the computer 121. Thus, when the user of the computer 111 wants to view the contents of the file, he or she needs to view the computer 121 directly. Similarly, the computer 211 cannot view the contents of the file on computer 221. Thus, when the user of the computer 211 wants to view the contents of the file, he or she needs to view the computer 221 directly.

Sixth Embodiment

A configuration of a network system according to a sixth embodiment will be described with reference to FIG. 8. In the fifth embodiment, the package 150 and the package 250 are used for improving usability for the user. However, the virtually closed network routed via the computer 111 and the computer 211 is inefficient from the viewpoint of a transmission path.

Figure 8:
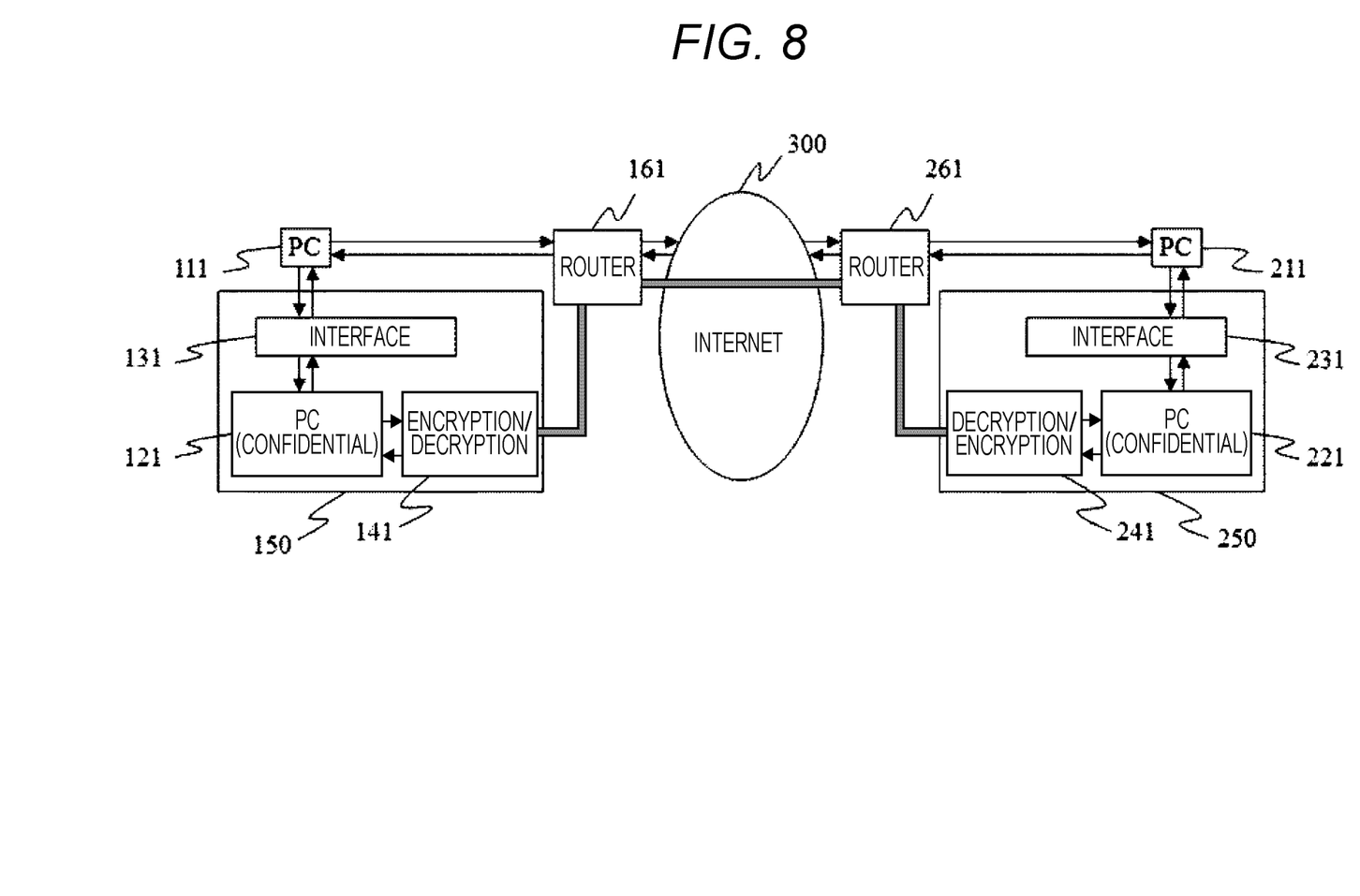
FIG. 8 is a diagram illustrating a configuration of a network system according to a sixth embodiment.

Therefore, in the network system according to the sixth embodiment, as illustrated in FIG. 8, the encryption/decryption unit 141 is directly connected to a router 161. Similarly, the decryption/encryption unit 241 is directly connected to a router 261. Thus, in the sixth embodiment, the transmission path for the virtually closed network can be prevented from being routed through the computer 111 and the computer 211. Here, the network system according to the fifth embodiment illustrated in FIG. 7 and the network system according to the sixth embodiment illustrated in FIG. 8 can be chosen depending on the purpose of use.

In the embodiments described above, the open network and the closed network form a two-story structure so that each user belongs to both networks, and the properties of both networks can be utilized. This enables coexistence of an open network and a closed network, whereby usability and security can both be guaranteed. Using the closed network, users can securely share information with other parties who belong to the open network.

What is claimed is:

1. A network system including a first site and a second site connected to each other via an open network and a closed network, wherein
the first site includes
a first computer,
a second computer,
a first interface connecting the first computer and the second computer to each other, and
an encryption/decryption unit connected to the second computer, and
the second site includes
a third computer,
a fourth computer,
a second interface connecting the third computer and the fourth computer to each other, and
a decryption/encryption unit connected to the fourth computer,
the first computer and the third computer belong to the open network,
the second computer and the fourth computer belong to the closed network,
the first interface performs control so that format information of first confidential information passes through the first interface but the first confidential information does not pass through the first interface between the first computer and the second computer,
the second interface performs control so that format information of second confidential information passes through the second interface but the second confidential information does not pass through the second interface between the third computer and the fourth computer,
the encryption/decryption unit and the decryption/encryption unit are connected to a wide area network, and form a virtually closed network using encryption in the wide area network,
for the open network, the first site and the second site are connected to each other via the wide area network,
for the closed network, the first site and the second site are connected to each other via the virtually closed network,
the encryption/decryption unit and the decryption/encryption unit each include a dedicated circuit through which the first and second confidential information is passed without being passed through either of the first and second interfaces.

2. The network system according to claim 1, wherein
the encryption/decryption unit is provided between the second computer and the wide area network, so that the second computer is separated from the wide area network, and
the decryption/encryption unit is provided between the fourth computer and the wide area network, so that the fourth computer is separated from the wide area network.

3. The network system according to claim 1, wherein:
the first interface, the second computer, and the encryption/decryption unit form a first package;
the second interface, the fourth computer, and the decryption/encryption unit form a second package;
the first package is connected to the virtually closed network via the first computer; and
the second package is connected to the virtually closed network via the third computer.

4. The network system according to claim 3, wherein
the encryption/decryption unit in the first package is connected to the first computer, and
the decryption/encryption unit in the second package is connected to the third computer.

5. The network system according to claim 1, further comprising:
a first package obtained by packaging the first interface, the second computer, and the encryption/decryption unit; and
a second package obtained by packaging the second interface, the fourth computer, and the decryption/encryption unit, wherein
the first package is connected to the virtually closed network via a first router, and
the second package is connected to the virtually closed network via a second router.

6. The network system according to claim 5, wherein
the encryption/decryption unit in the first package is connected to the first router, and
the decryption/encryption unit in the second package is connected to the second router.

* * * * *